Jan. 6, 1925.  F. W. WITTKOWSKI  1,522,402

FOOTBALL GAME

Filed Sept. 29, 1922  3 Sheets-Sheet 2

Frederick W. Wittkowski.
INVENTOR

BY Victor J. Evans.
ATTORNEY

WITNESS:

Jan. 6, 1925.

F. W. WITTKOWSKI

FOOTBALL GAME

Filed Sept. 29, 1922

1,522,402

3 Sheets-Sheet 3

Frederick W. Wittkowski, INVENTOR

BY Victor J. Evans. ATTORNEY

WITNESS:

Patented Jan. 6, 1925.

1,522,402

UNITED STATES PATENT OFFICE.

FREDERICK WILLIAM WITTKOWSKI, OF DES MOINES, IOWA.

FOOTBALL GAME.

Application filed September 29, 1922. Serial No. 591,367.

*To all whom it may concern:*

Be it known that I, FREDERICK WILLIAM WITTKOWSKI, a citizen of the United States, residing at Des Moines, in the county of Polk and State of Iowa, have invented new and useful Improvements in Football Games, of which the following is a specification.

This invention relates to amusement devices particularly to game apparatus and has for its object the provision of a novel foot ball game in which use is made of a suitably inscribed legend bearing chart or playing surface over which may be moved markers which are placed in different positions depending upon indications given on playing tables co-operating with spinners designed to be rotated by the successive players, the numerals on the spinners referring to advantages, penalties and the like on the tables.

An important object is the provision of a game of this character which will be simple and inexpensive in manufacture, amusing and entertaining in use, and a general improvement in the art.

Figure 1:
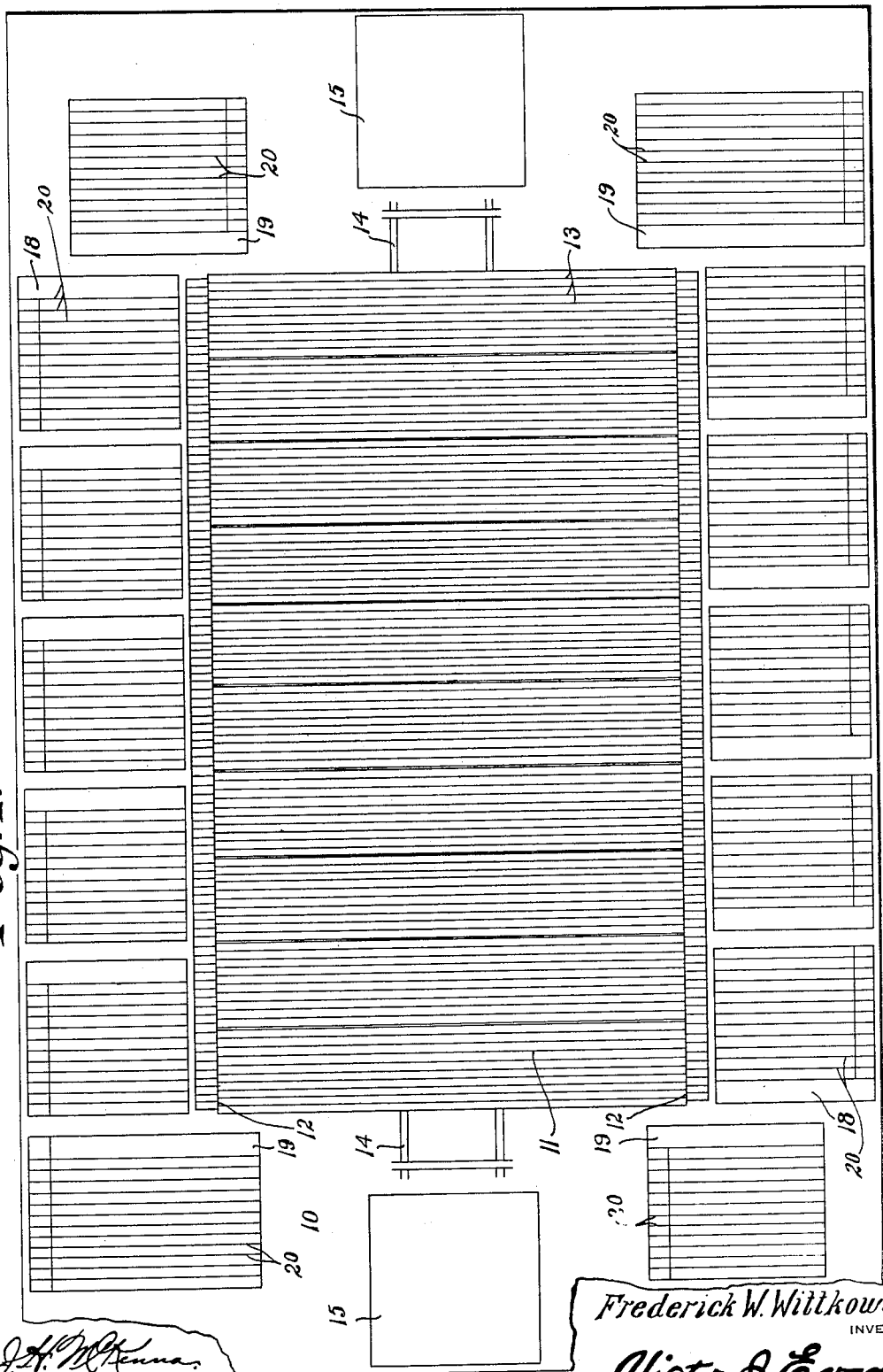
Figure 2:
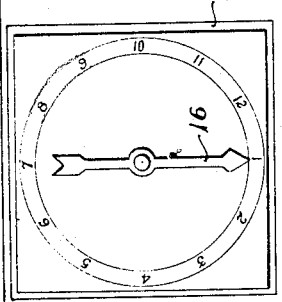
Figure 3:
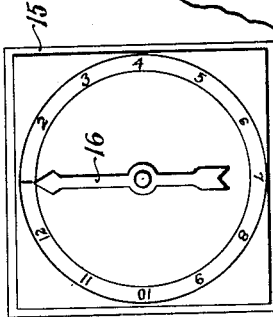

With the above and other objects and advantages in view the invention consists in the details of construction to be hereinafter more fully described and claimed and illustrated in the accompanying drawings, in which:

Figure 1 is a plan view of the complete playing device, the various legends on the tables being omitted for the sake of clearness, Figure 2 is an elevation of half of the playing surface with all the proper legends applied and Figure 3 is a similar view of the other half.

Referring more particularly to the drawings the numeral 10 designates a suitable playing board which might be constructed of wood or any other preferred material and adapted to be laid within a containing box, or the various inscriptions and lines on the playing surface may be printed on the bottom of a box or on the underside of the cover therefor. If preferred the entire playing chart might be printed on a separate piece of paper and adapted to be pasted on to any suitable supporting surface. It must be distinctly understood that there is absolutely no limitation whatever as to this minor detail.

The playing surface consists of a rectangular central area 11 defined by spaced longitudinal lines 12 and 101 transverse lines 13 which provide 100 spaces which are numbered consecutively from the diagonally opposite corners as clearly shown. Every tenth transverse line is either double or darker than the others to divide this playing field into ten ten yard spaces corresponding to the division of a regular foot ball field. The central dark or double line preferably bears the inscription "50 yard line." At the ends of this playing field 11 I provide the representation of goal posts 14.

At each end of the board is a space 15 within which may be formed or upon which may be mounted a spinner which includes a movable arrow or pointer 16 movable over a circular series of numerals ranging from 1 to 12. In conjunction with the playing surface and the spinner I provide markers 17 which are designed to be placed along the playing field to indicate the advances or losses made by the players of the opposing teams.

Inscribed upon the board at opposite sides of the playing surface 11 are tables 18 relating to different plays and these tables are the same at both sides, one set being readable from one end of the board and the other being readable from the other end and at the ends of the playing surface are other similar tables 19 likewise facing in opposite directions. Each table 18 or 19 bears at its top a legend indicating a play such as, "Kick off", "Line buck", "Forward pass", "End runs", "Drop kick" or "Place kick", "Punts" and "Free kick". Each table is divided by transverse lines 20 into 12 spaces at the beginnings of which are inscribed numerals ranging from 1 to 12 and within which are inscribed various legends indicating yards of gain, yards of loss, fumbles, failures, touch downs and in fact all the advantages or penalties incident to a regular foot ball game. These numerals range from 1 to 12 as above stated and these numerals correspond to the numerals over which the spinners travel.

In playing the game any number of players may participate, taking turns. The player or players of each team uses one of the spinners and the other team uses the other spinner, the board lying with its ends toward the different players. The player having first go turns his spinner arrow 16 and when it comes to rest notes the numeral to which the arrow points. It is first necessary that he call the play he intends to make. Having spun and ascertained the number pointed to, he refers to the table 18 or 19 which bears at its top the legend corresponding to the play he called and runs down this table to the numeral corresponding to the numeral indicated by the spinner. By referring to the legend opposite this numeral in the table the result of his play will be ascertained and the marker 17 is correspondingly moved along the playing field 10. Each player receives four chances to make ten yards when only two are playing, but if four are playing each player has two chances, in other words each side or team has four chances. After making a touch down either side receives a chance for free goal. To kick off or to receive the kick off can be decided by using the spinners, the high number receiving the choice. After the kick off is made each play must be called before spinner is spun. For instance if a forward pass is called and the spinner is spun and stops at 5, the player refers to the tables 19 or 19 at the left hand side of the chart and finds that No. 5 of the forward pass is "incomplete." This will mean that the player or team has one down and three more downs to go.

A drop kick cannot be attempted unless the ball is within fifty yards of the goal line. The ball or marker should be moved down the right hand side of the chart so as to allow the players to watch it when it stops on any of the lines marked "Quarter", there being twenty of these "Quarter" legends arranged at one side of the series of 100 numbers. When the marker or ball is on a line marked "Quarter" the game board is turned around and the ball placed at the same number of yards from the goal and the game resumed. If the ball should happen to be placed on a line marked "Quarter" when the board is turned around, it does not count. After the second quarter of the game ends, the ball must be kicked over with the losing side receiving or kicking as they may choose. The third quarter is treated in the same manner as the first and the fourth quarter ends the game. Should the ball stop on a line marked "Quarter" on the kick off or after each quarter before a play has been called it does not count and the side having the ball resumes play with the ball in their possession.

From the foregoing description and a study of the drawings it will be apparent that I have thus provided a novel game apparatus by means of which an imitation foot ball game may be readily played in strict accordance with the rules and regulations of a regular game, means being provided for giving all the advantages and entailing penalties and losses just as in a regular game.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A foot ball game comprising a playing board inscribed centrally with a playing surface formed as the representation of a foot ball field and subdivided to designate yards and provided with numerals indicating the number of yards, the representation of goal posts at the ends of said playing field, and the board being further inscribed with a plurality of tables disposed along the side lines of the field and in each corner of the board respectively and each table having a heading designating the name of a play in a regular foot ball game, each table being subdivided into a series of spaces numbered from one to twelve within which are inscribed legends stating penalties, advantages and incidents in a foot ball game, in combination with spinners arranged in each end of the field and movable over a series of numbers corresponding to the number of spaces in each table, and markers disposable along the playing field in correspondence with the result indicated in the legends in the tables, and the yard numbers and the tables adjacent the side lines of the field being readable from one end and those at the other side being readable from the other end.

In testimony whereof I affix my signature.

FREDERICK WILLIAM WITTKOWSKI.